United States Patent
Sakurai et al.

(10) Patent No.: US 10,857,721 B2
(45) Date of Patent: Dec. 8, 2020

(54) BLOW MOLDING DEVICE, BLOW MOLDING METHOD, AND PREFORM SEALING/POSITIONING PART

(71) Applicant: NISSEI ASB MACHINE CO., LTD., Komoro (JP)

(72) Inventors: Atsushi Sakurai, Komoro (JP); Yoshiaki Tanabe, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 508 days.

(21) Appl. No.: 15/514,316

(22) PCT Filed: Sep. 17, 2015

(86) PCT No.: PCT/JP2015/076495
§ 371 (c)(1),
(2) Date: Mar. 24, 2017

(87) PCT Pub. No.: WO2016/047552
PCT Pub. Date: Mar. 31, 2016

(65) Prior Publication Data
US 2017/0291348 A1 Oct. 12, 2017

(30) Foreign Application Priority Data
Sep. 25, 2014 (JP) .................................. 2014-195700

(51) Int. Cl.
*B29C 49/56* (2006.01)
*B29C 49/42* (2006.01)
(Continued)

(52) U.S. Cl.
CPC .............. *B29C 49/56* (2013.01); *B29C 49/42* (2013.01); *B29C 49/4205* (2013.01);
(Continued)

(58) Field of Classification Search
CPC ......................... B29C 49/56; B29C 2049/4294
See application file for complete search history.

(56) References Cited

U.S. PATENT DOCUMENTS 4,095,927 A * 6/1978 Roberg .................. B29C 49/76
425/525
4,196,165 A * 4/1980 Michel .................... B29C 49/58
264/530
(Continued)

FOREIGN PATENT DOCUMENTS

EP 0 713 758 A2 5/1996
EP 0 989 072 A2 3/2000
(Continued)

OTHER PUBLICATIONS

International Search Report from the Japanese Patent Office for International Application No. PCT/JP2015/076495, dated Nov. 17, 2015.
(Continued)

*Primary Examiner* — Timothy Kennedy
(74) *Attorney, Agent, or Firm* — Finnegan, Henderson, Farabow, Garrett & Dunner, L.L.P.

(57) ABSTRACT

A blow molding device of the invention includes a pair of blow cavity split molds (50A, 50B), a chuck member (80) that chucks a mouth portion (20) and conveys a preform (10A), a blow core mold (70) that includes a tubular portion (71) which surrounds circumferences of the mouth portion and a flange (25) and introduces blow air into the preform, and a pair of projecting members (60A, 60B) which have a halved ring shape and are provided detachably on each upper surface of the pair of blow cavity split molds. Each of the pair of projecting members includes an airtight sealing portion (61) which is in contact with a lower end face of the
(Continued)

tubular portion of the blow core mold, and a positioning portion (62) which positions the flange of the preform.

2 Claims, 8 Drawing Sheets

(51) Int. Cl.
B29C 49/58 (2006.01)
B29C 49/48 (2006.01)
B29C 49/12 (2006.01)
B29K 67/00 (2006.01)
B29K 105/00 (2006.01)
B29L 31/00 (2006.01)

(52) U.S. Cl.
CPC .............. *B29C 49/48* (2013.01); *B29C 49/58* (2013.01); *B29B 2911/14426* (2013.01); *B29C 49/12* (2013.01); *B29C 2049/4231* (2013.01); *B29C 2049/4294* (2013.01); *B29C 2049/563* (2013.01); *B29C 2049/5827* (2013.01); *B29K 2067/003* (2013.01); *B29K 2105/258* (2013.01); *B29L 2031/716* (2013.01)

(56) References Cited

U.S. PATENT DOCUMENTS

| | | | |
|---|---|---|---|
| 4,497,622 A * | 2/1985 | Grebowiec | B29C 49/76 264/533 |
| 5,281,387 A | 1/1994 | Collette et al. | |
| 5,340,302 A * | 8/1994 | Ingram | B29C 49/4205 425/528 |
| 6,464,486 B1 | 10/2002 | Barray et al. | |
| 7,862,327 B2 * | 1/2011 | Rousseau | B29C 49/58 425/529 |
| 8,192,656 B2 * | 6/2012 | Adriansens | B29C 49/58 264/40.5 |
| 2002/0076462 A1 * | 6/2002 | Boyd | B29C 49/46 425/143 |
| 2006/0115546 A1 | 6/2006 | Santais et al. | |
| 2008/0254161 A1 | 10/2008 | Rousseau et al. | |
| 2010/0159058 A1 * | 6/2010 | Doudement | B29C 49/58 425/161 |
| 2013/0164404 A1 * | 6/2013 | Maki | B29C 49/58 425/535 |
| 2014/0225315 A1 | 8/2014 | Ogihara | |

FOREIGN PATENT DOCUMENTS

| | | |
|---|---|---|
| EP | 2 586 588 A1 | 5/2013 |
| JP | 2000-512944 | 10/2000 |
| JP | 2002-307541 | 10/2002 |
| JP | 2004-34567 | 2/2004 |
| JP | 2009-51570 | 3/2009 |
| JP | 2009-126130 | 6/2009 |
| WO | WO 2011/148879 | 12/2011 |
| WO | WO 2013/027692 | 2/2013 |
| WO | WO 2014-001099 | 1/2014 |

OTHER PUBLICATIONS

Supplementary European Search Report issued in corresponding European Application No. 15845415.7, dated Mar. 29, 2018.

* cited by examiner

FIG.9
(A)
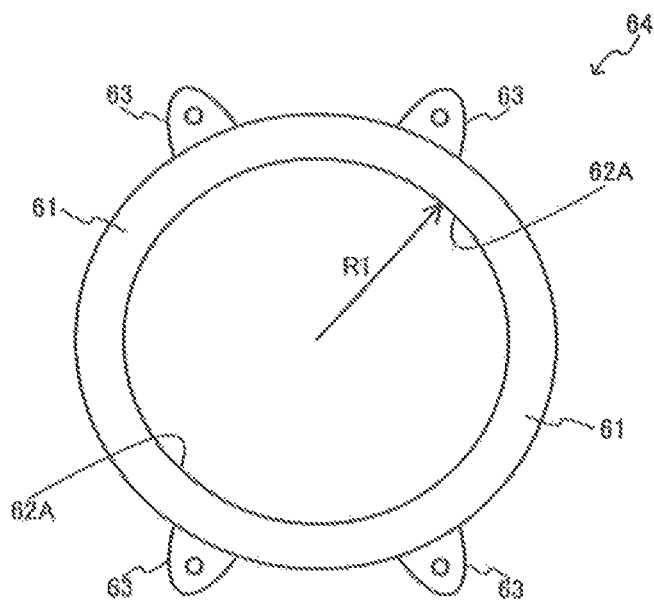
(B)
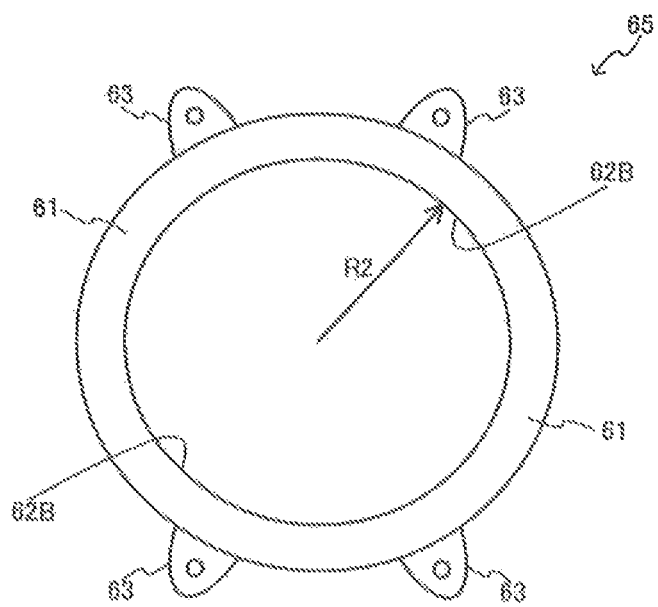

BLOW MOLDING DEVICE, BLOW MOLDING METHOD, AND PREFORM SEALING/POSITIONING PART

TECHNICAL FIELD

The invention relates to a blow molding device, a blow molding method, a preform sealing/positioning part, and the like.

BACKGROUND ART

In a two-stage blowing machine using a cold parison, unlike a single-stage blowing machine using a hot parison (preform) in which a preform is conveyed by a lip mold which is fixed to a rotary table, a mouth portion of a preform is chucked by a chuck member and the preform which is heated from a room temperature is conveyed to a blow molding section.

In a blow molding device of this type, a preform which is conveyed by a chuck member is held in a blow mold which is closed, and a blow core mold is lowered after the chuck member is retreated. This blow core mold seals airtight a mouth portion of the preform around a circumference thereof and then blows air into the preform.

There is a blow molding device in which a lower end of a blow, core mold is brought into abutment with an upper surface of a flange (which is called a support ring or a neck ring) provided between a mouth portion and a body portion of a preform to thereby seal airtight the mouth portion of the preform around a circumference thereof (refer to Patent References 1, 2).

Unlike the methods in Patent References 1, 2, there is a blow molding device in which a lower end of a blow core mold or a seal member provided at the lower end is brought into abutment with a top surface of a blow mold to thereby seal airtight a mouth portion around a circumference thereof (Patent Reference 3).

PRIOR ART REFERENCE

Patent Reference

Patent Reference 1: JP-A-2004-034567
Patent Reference 2: JP-A-2009-126130
Patent Reference 3: JP-A-2002-307541

SUMMARY OF THE INVENTION

Problem that the Invention is to Solve

There is no standard for flanges of preforms used for food containers, and therefore, there is a case where a flange is used which has an outside diameter which is substantially equal to a height of a thread provided on a mouth portion. As this occurs, the mouth portion cannot be sealed airtight at the flange by lowering a blow core mold. This is because the flange is accommodated inside the tubular blow core mold, and in the event that a portion is provided which is configured to be brought into abutment with the flange, the portion comes into interference with the thread to thereby prevent the blow core mold from being lowered. Thus, the sealing configuration described in Patent References 1, 2 cannot be adopted depending upon shapes of flanges.

On the other hand, in the case of the sealing method adopted in Patent Reference 3, a metal of the blow core mold and a metal of the blow mold are brought into contact with each other repeatedly under a high pressure every time a blow molding is carried out. This causes one or both of the blow core mold and the blow mold to wear, leading to fears that the service lives of the blow core mold and the blow mold are shortened. Even if a seal member is interposed between the blow core mold and the blow mold, the contact between the metals cannot be avoided.

There is another problem that a position of the preform which is transferred from the chuck member to the blow mold deviates. In the two-stage blowing machine, unlike the single-stage blowing machine in which the preform is held by the lip mold even during blow molding, the preform is positioned and held in place in the blow mold after the preform is transferred from the chuck member to the blow mold. As this occurs, in a case where the preform is not properly centered in the blow mold, there may be a case where a molding failure occurs.

An object of several aspects of the invention is to provide a blow molding device, a blow molding method, and a preform sealing/positioning part, which can seal a mouth portion of a preform around a circumference thereof irrespective of shapes of flanges and without causing a blow core mold and a blow mold to wear, and which can suppress the occurrence of a molding failure attributed to a position deviation of the preform.

Means for Solving the Problems (1) An aspect of the invention is related to a blow molding device for blow-molding a preform which includes a mouth portion, a body portion, and a flange provided between the mouth portion and the body portion into a container, the blow molding device including:
 a pair of blow cavity split molds;
 a chuck member that chucks the mouth portion and conveys the preform to the pair of blow cavity split molds which are opened;
 a blow core mold that includes a tubular portion which surrounds circumferences of the mouth portion and the flange of the preform and introduces blow air into the preform, after the chuck member is retracted from the preform which is disposed in the pair of blow cavity split molds which are closed; and
 a pair of projecting members which have a halved ring shape and are provided detachably on each upper surface of the pair of blow cavity split molds,
  wherein each of the pair of projecting members includes:
  an airtight sealing portion which is in contact with a lower end face of the tubular portion of the blow core mold, and
  a positioning portion which positions the flange of the preform when the pair of blow cavity split molds are closed.

According to the aspect of the invention, the airtight sealing portions which are provided on each of the pair of projecting members are in contact with the lower end face of the tubular portion of the blow core mold, whereby the mouth portion and the flange of the preform can be sealed up airtight around the circumferences thereof. Thus, unlike the Patent References 1, 2, airtight sealing can be performed without using the flange of the preform.

Moreover, since the pair of projecting members are detachable from the pair of blow cavity split molds, the pair of projecting members can be replaced, and this prevents the shortening of service lives of the pair of blow cavity split molds which are relatively expensive.

Furthermore, the pair of projecting members move in the mold closing direction together with the pair of blow cavity split molds to thereby position and center the flange of the preform by the positioning portions. A molding failure in which the thickness of a container is not properly distributed is caused as a result of a distance between a preform wall portion and a cavity surface being changed due to the preform being disposed eccentrically. However, according to the aspect of the invention, the occurrence of such a molding failure can be suppressed.

(2) In the aspect of the invention, the airtight sealing portion has a lower wear resistance than that of the lower end face of the tubular portion of the blow core mold, thereby making it possible to prevent the shortening of a service life of the blow core mold which is relatively expensive.

(3) In the aspect of the invention, the blow molding device can further include a seal member which is interposed between the blow core mold and the positioning portion when the blow core mold is lowered. By doing so, the airtight sealing performance between the blow core mold and the positioning portion is enhanced. Here, the seal member can be formed into a ring shape when the seal member is provided on the lower end face of the tubular portion of the blow core mold, whereas the seal member can be formed into a halved ring shape when the seal member is provided on each airtight sealing portion of the pair of projecting members.

(4) In the aspect of the invention, each of the pair of projecting members can have an attaching portion which is provided further radially outwards than the airtight sealing portion and which is fastened to each upper surface of the pair of blow cavity split molds. By doing so, it is possible to prevent the deterioration in airtight sealing performance which may occur when the airtight sealing portions are fastened with bolts.

(5) In the aspect of the invention, the mouth portion of the preform can further include a cap holding portion which projects further outwards than an outer circumferential surface of the mouth portion, and an outside diameter of the flange is equal to or smaller than an outside diameter of the cap holding portion. According to the flange having such shape, although it is not possible to perform airtight sealing by pressing the flange by the blow core mold, according to the aspect of the invention, the airtight sealing performance can be ensured irrespective of the shape of the flange.

(6) In an aspect of the invention, the mouth portion and the flange portion may be whitened and crystallized. In whitening and crystallizing the mouth portion and the flange, the mouth portion and the flange need to be heated to the crystallization temperature. Then, the flange contracts in size after being heated, whereby the outside diameter of the flange changes from that of the flange when the flange is injection-molded. Since the pair of projecting members used in the aspect of the invention can be machined freely as a single part, when compared with the configuration in which the preform is positioned by the blow cavity split molds, the blow cavity split molds themselves do not have to be machined, and hence, the expensive blow cavity split molds are not wasted as a disposal for the reason that there is inconsistency in positioning size.

(7) Another aspect of the invention is related to a blow molding method for blow-molding a preform which includes a mouth portion, a body portion and a flange which is provided between the mouth portion and the body portion into a container, the blow molding method including:

a step of chucking the mouth portion by a chuck member and conveying the preform to a pair of blow cavity split molds which are opened;

a mold closing step of closing the pair of blow cavity split molds;

a step of retracting the chuck member from the preform which is disposed in the pair of blow cavity split molds which are closed;

a sealing step of sealing up airtight the mouth portion of the preform around a circumference thereof by lowering a blow core mold which includes a tubular portion; and a step of blow-molding the preform into the container by introducing blow air into the preform by the blow core mold, wherein the mold closing step includes a step of positioning the flange of the preform by moving a pair of projecting members, which have a halved ring shape and are provided detachably on each upper surface of the pair of blow cavity split molds, together with the pair of blow cavity split molds, and wherein the sealing step includes a step of sealing up airtight the mouth portion of the preform around the circumference thereof by bringing a lower end face of the tubular portion of the blow core mold which is lowered into contact with the pair of projecting members.

Also according to the blow molding method according to the other aspect of the invention, the mouth portion of the preform can be sealed up around the circumference thereof irrespective of the shape of the flange, and at this time, there is no risk of shortening the service lives of the pair of blow cavity split molds which are relatively expensive. Furthermore, it is possible to suppress the occurrence of a molding failure due to the preform being disposed eccentrically.

(8) A further another aspect of the invention is related to a preform sealing/positioning part for a preform including a mouth portion, a body portion, and a flange which is provided between the mouth portion and the body portion, the preform sealing/positioning part comprising a pair of projecting members which have a halved ring shape and are provided detachably on each upper surface of a pair of blow cavity split molds, wherein each of the pair of projecting members include:
an airtight sealing portion which is brought into contact with a lower end face of the tubular portion of the blow core mold, and
a positioning portion which positions the flange of the preform when the pair of blow cavity split molds are closed.

According to the further other aspect of the invention, it is possible to provide the part which can seal up the mouth portion of the preform around the circumference thereof irrespective of the shape of the flange, and by using this part as consumables, the service lives of the pair of blow cavity split molds which are relatively expensive can be prevented from being shortened. Furthermore, by enhancing the part accuracy, it is possible to suppress the occurrence of a molding failure due to the preform being disposed eccentrically.

(9) In the further other aspect of the invention, each of the pair of projecting members can have an attaching portion which is provided further radially outwards than the airtight sealing portion and which is fastened to each upper surface of the pair of blow cavity split molds. By doing so, it is possible to prevent the deterioration in airtight sealing performance which may occur when the airtight sealing portions are fastened with bolts.

(10) In the further other aspect of the invention, the preform sealing/positioning part can be one of a plurality of types of preform sealing/positioning parts having positioning portions of different sizes corresponding to an outside diameter of the flange, and the airtight sealing portion and the attaching portion can be common for the plurality of types of preform sealing/positioning parts. In this way, it is possible to select and use a preform sealing/positioning part having a positioning portion whose size matches the outside diameter of a flange of a preform to be conveyed into the pair of blow cavity split molds from a plurality of types of preform sealing/positioning parts having positioning portions of different sizes. By doing so, for example, in the event that flanges vary in size lot by lot or in the event that a plurality of types of preforms which differ from one another only in flange size are used, a preform can be positioned with good accuracy only by replacing the preform sealing/positioning parts.

BRIEF DESCRIPTION OF DRAWINGS

FIGS. 9(A), 9(B) are plan views showing a plurality of sealing/positioning parts having positioning portions whose inner diameters are different.

MODE FOR CARRYING OUT THE INVENTION

Hereinafter, a preferred embodiment of the invention will be described in detail. It should be noted that an embodiment which will be described below does not limit unreasonably the details of inventions which are described in the claims, and that all configurations which will be described in this embodiment are not necessarily essential to the means for solving the problem according to the invention.

1. Wide-Mouthed Container and Preform

Figure 1:
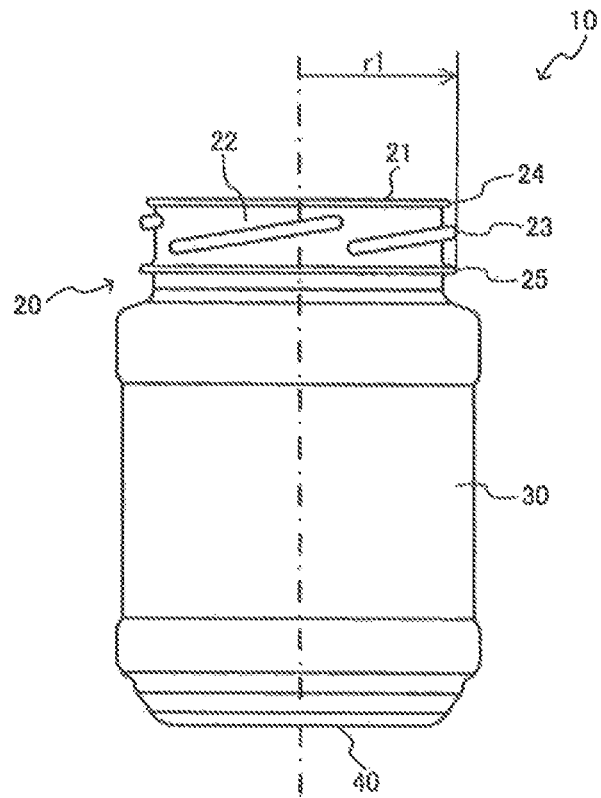
FIG. 1 is a front view of a wide-mouthed container which is blow-molded by a blow molding device according to an embodiment of the invention.

FIG. 1 is a front view of a wide-mouthed container which is molded by a blow molding machine according to a first embodiment of the invention. In FIG. 1, a wide-mouthed container 10 is made from a synthetic resin (for example, PET: polyethylene terephthalate). In recent years, the application of PET containers has been spreading, and PET containers are now made use of as food filling containers in addition to the application to drink containers. In order to more easily fill various types of food such as tomato paste and pickles, the wide-mouthed container 10 is used. The wide-mouthed container 10 has a mouth portion 20, a body portion 30 and a bottom portion 40. A cap (not shown) is attached to the mouth portion 20 after filler such as food is filled in the wide-mouthed container 10, whereby the wide-mouthed container 10 is tightly sealed up.

The mouth portion 20 has a mouth tubular portion 22 and a plurality of engaged portions (cap attaching portion) 23 which are formed so as to project further outwards than the mouth tubular portion 22 and with which a plurality of engaging portions (not shown) of a lid or a cap are brought into engagement. The engaged portions 23 can be made up, for example, of threads. The mouth portion 20 can further include a top flange 24 which is formed on a top surface 21 so as to project further outwards than the mouth tubular portion 22 with its projecting height from the mouth tubular portion 22 being lower than the engaged portions 23. However, the top flange 24 is not essential to the mouth portion 20. A flange 25 (which is called a support ring or a neck ring) is provided between the mouth portion 20 and the body portion 30. An outside diameter of the flange 25 is equal to or smaller than an outside diameter of the threads (the cap attaching portion) 23. In this embodiment, the outside diameter r1 of the flange 25 is substantially the same as the outside diameter r1 of the threads (the cap attaching portion) 23. In filling and heating the contents of the wide-mouthed container 10, the mouth portion 20 and the flange 25 are heated to nearly, for example, 180° C. which is the crystallization temperature of PET and is then cooled down gradually to thereby be whitened and crystallized.

Figure 2:
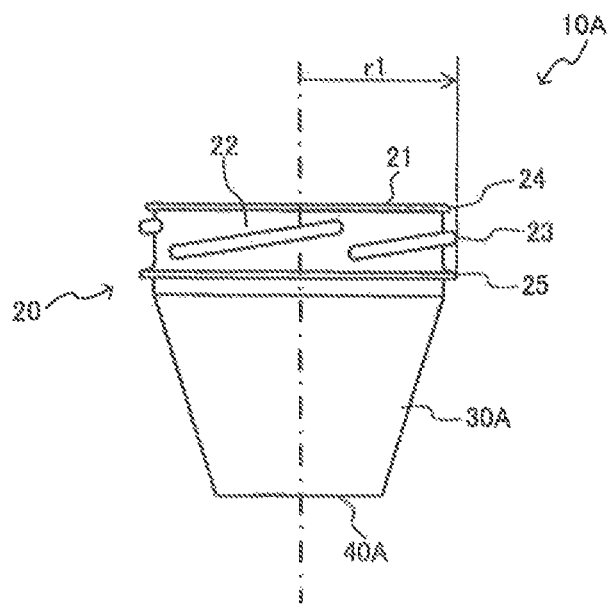
FIG. 2 is a front view of a preform which is used to blow-mold the wide-mouthed container shown in FIG. 1.

FIG. 2 is a front view of a preform 10A. The preform 10A shown in FIG. 2 is blow-molded to obtain the wide-mouthed container 10 shown in FIG. 1. The preform 10A and the wide-mouthed container 10 both have the mouth portion 20 and the flange portion 25 which are obtained through injection molding. A body portion 30A and a bottom portion 40A of the preform 10A are blow-molded into the body portion 30 and the bottom portion 40 of the wide-mouthed container 10. The mouth portion 20 and the flange portion 25 can be whitened and crystallized on the preform 10A before the preform 10A is blow-molded into the wide-mouthed container 10.

2. Preform Sealing/Positioning Configuration in Blow Molding Device

Figure 3:
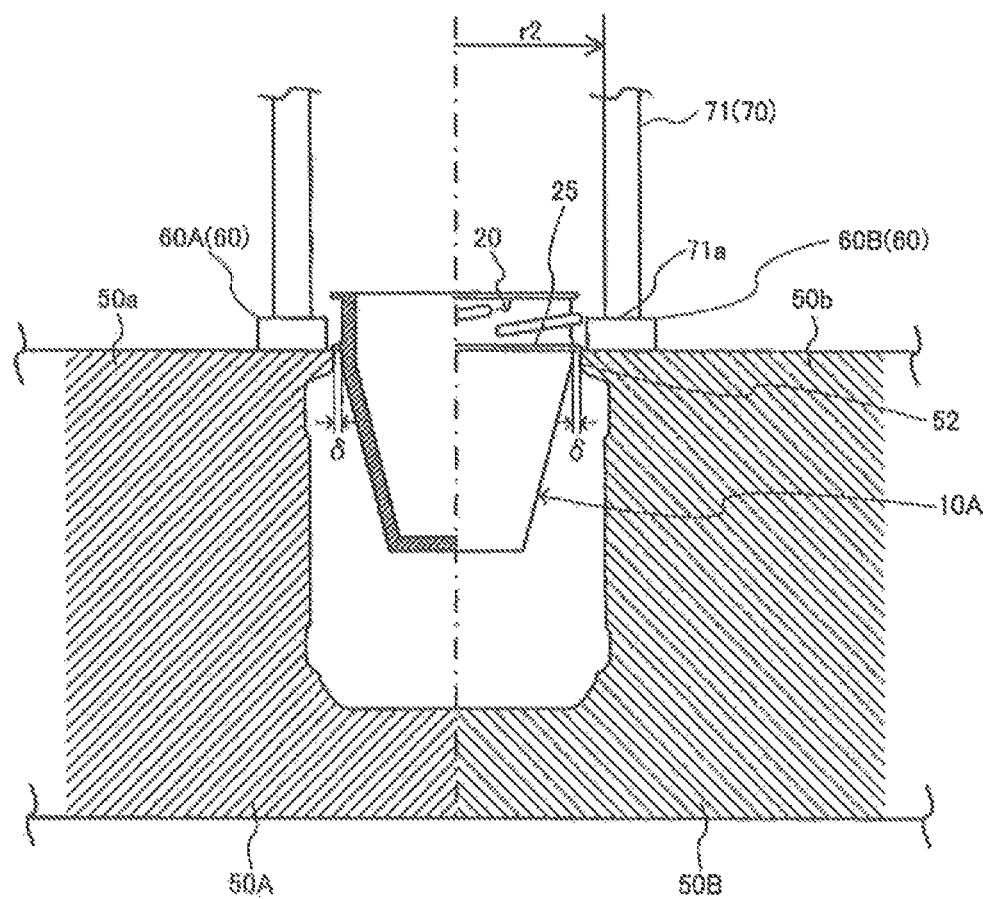
FIG. 3 is a drawing showing a preform sealing/positioning configuration in the blow molding device according to the embodiment of the invention.

FIG. 3 shows a preform sealing/positioning configuration in the blow molding device. FIG. 3 shows a state in which the preform 10A is disposed in a pair of blow cavity split molds 50A, 50B which are clamped together. The body portion 30A and the bottom portion 40A of the preform 10A are disposed through an opening 52 in an interior of the pair of blow cavity split molds 50A, 50B which are closed together, and the flange 25 is provided on upper surfaces 50a, 50b which lie further outwards than the opening 52, whereby the preform 10A is supported on the pair of blow cavity split molds 50A, 50B with the body portion 30A and the bottom portion 40A disposed therein.

Figure 4:
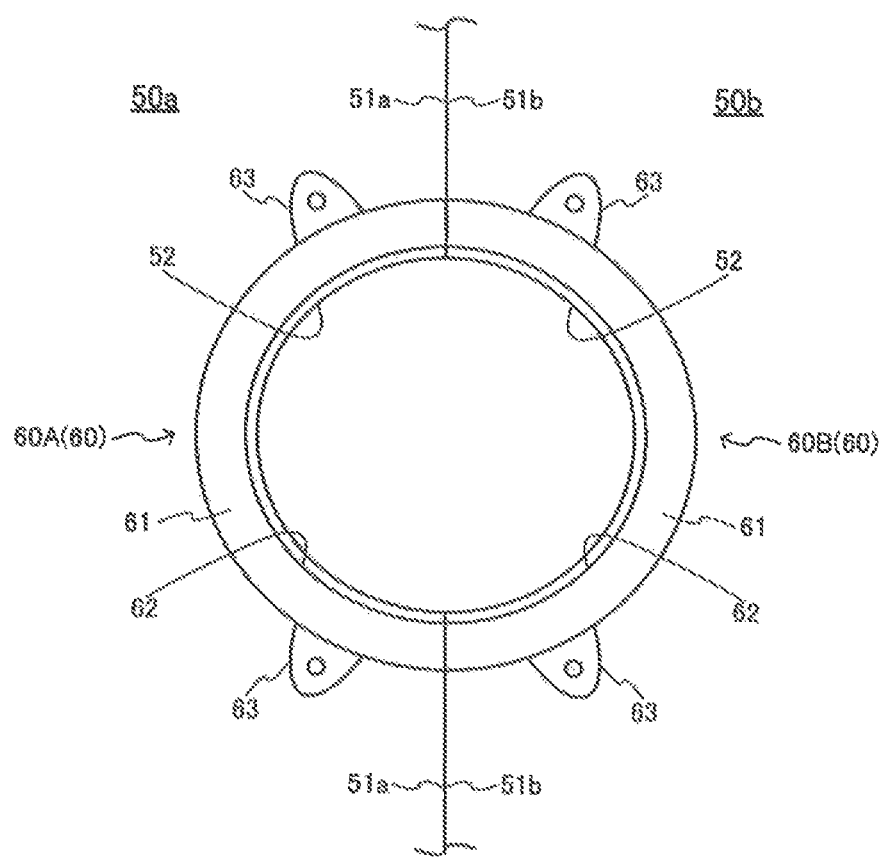
FIG. 4 is a plan view of a pair of blow cavity split molds which are closed together.

FIG. 4 is a plan view of the pair of blow cavity split molds 50A, 50B which are closed together with parting planes 51a, 51b being in close contact with each other. As shown in FIGS. 3 and 4, a sealing/positioning part 60 which seals and positions the preform 10A is provided detachably on the upper surfaces 50a, 50b of the pair of blow cavity split molds 50A, 50B. This part 60 has a pair of projecting members 60A, 60B having a halved ring shape. A blow core mold 70 shown in FIG. 3 has a tubular portion 71 having an inner diameter r2 (r2>r1), which surrounds the mouth portion 20 and the flange 25 of the preform 10A.

As shown in FIG. 4, each of the pair of projecting members 60A, 60B have an airtight sealing portion 61 which is in contact with a lower end face 71a of the tubular portion 71 of the blow core mold 70 and a positioning portion 62 which positions the flange 25 of the preform 10A when the pair of blow cavity split molds 50A, 50B are closed together. In this embodiment, the airtight sealing portions 61 are formed on upper surfaces of the pair of projecting members 60A, 60B, and the positioning portions 62 are formed on inner circumferential surfaces of the pair of projecting members 60A, 60B. Further, each of the pair of projecting members 60A, 60B can include attaching portions 63 with which the pair of projecting members 60A, 60B can detachably be attached to the upper surfaces 50a, 50b of the pair of blow cavity split molds 50A, 50B. The attaching portions 63 are provided so as to project further radially outwards than the airtight sealing portions 61 and are fastened to the upper surfaces 50a, 50b of the pair of blow cavity split molds 50A, 50B with bolts. This can prevent the deterioration of an airtight sealing property which would otherwise be caused in the event that the airtight sealing portions 61 are bolted directly to the upper surfaces 50a, 50b.

According to this embodiment, the airtight sealing portions 61 which are provided individually on each of the pair of projecting members 60A, 60B is in contact with the lower end face 71a of the tubular portion 71 of the blow core mold, whereby the mouth portion 20 and the flange 25 of the preform 10A can be sealed up in an airtight fashion around circumferences thereof. Accordingly, the airtight sealing can be performed independently of the shape of the flange 25 of the preform 10A. In addition, the tubular portion 71 of the blow core mold and the airtight sealing portions 61 of the pair of projecting members 60A, 60B seal up the mouth portion 20 and the flange 25 around the circumferences thereof. Therefore, even when highly-pressurized air is introduced, pressures inside and outside the mouth portion 20 of the preform 10A become the same, whereby the deformation of the mouth portion 20 is suppressed.

Furthermore, the pair of projecting members 60A, 60B move together with the pair of blow cavity split molds 50A, 50B in a mold closing direction, and the flange 25 of the preform 10A can be positioned by the positioning portions 62, whereby the preform 10A can be centered. As shown in FIG. 3, in the preform 10A so centered, a slight gap δ is produced uniformly in a circumferential direction between an outer wall of a portion directly below the flange 25 (which is also referred to as a shoulder portion) and a surface of a cavity defined by the pair of blow cavity split molds 50A, 50B. The gap δ is about 0.2 to 0.3 mm, for example. However, in the event that the preform 10A is disposed eccentrically, the gap δ is not formed uniformly. In the event that the gap δ is small, the shoulder portion is not stretched sufficiently, and thus the shoulder portion becomes thick, whereas in the event that the gap δ is great, the shoulder portion is stretched greatly, and thus the shoulder portion becomes thin. In the event that the preform 10A is disposed more eccentrically, the gap δ becomes nil, and only one side of the preform 10A is brought into contact with the cavity surface, whereby the potential heat of the preform 10A is removed. Therefore, a difference in thickness between the thick portion and the thin portion becomes greater. In this way, a circumferential thickness distribution is generated in the container 10, leading a cause for a molding failure. In this embodiment, the occurrence of such a molding failure can be suppressed by positioning the flange 25 of the preform 10A by the positioning portions 62.

Moreover, the pair of projecting members 60A, 60B are detachable from the pair of blow cavity split molds 50A, 50B, and therefore, these projecting members 60A, 60B are replaceable as consumables, whereby the service lives of the pair of blow cavity split molds 50A, 50B which are relatively expensive can be prevented from being shortened. Here, in whitening and crystallizing the mouth portion 20 and the flange 25, the flange 25 contracts in size after the heating for the crystallization and an outside diameter becomes different from the outer diameter when injection-molding is performed. In this embodiment, since the pair of projecting members 60A, 60B can be machined freely as a single part, when compared with a configuration in which the pair of projecting members 60A, 60B are positioned by the pair of blow cavity split molds 50A, 50B, the blow cavity split molds 50A, 50B themselves do not have to be machined, and hence, the expensive blow cavity split molds 50A, 50B are not wasted as a disposal for the reason that there is inconsistency in positioning size.

In this embodiment, the airtight sealing portions 61 can have a lower wear resistance than that of the lower end face 71a of the tubular portion 71 of the blow core mold 70. For example, in the case of the lower end face 71a of the tubular portion 71 of the blow core mold 70 being formed of a steel material which is a general material for molds, the airtight sealing portions 61 can be formed of an aluminum-based material (aluminum or aluminum alloy). By doing so, it is possible to prevent the shortening of the service life of the blow core mold 70 which is relatively expensive.

The contact between the lower end face 71a of the tubular portion 71 of the blow core mold 70 and the airtight sealing portions 61 is not limited to direct contact between the metals, and a seal member formed from resin may be interposed therebetween. By doing so, the airtight sealing performance can be enhanced. Here, the seal member can be formed into a ring shape when the seal member is provided on the lower end face 71a of the tubular portion 71 of the blow core mold 70, whereas the seal member can be formed to have a halved ring shape when the seal member is provided on each airtight sealing portions 61 of the pair of projecting members 60A, 60B.

3. Blow Molding Method

Figure 6:
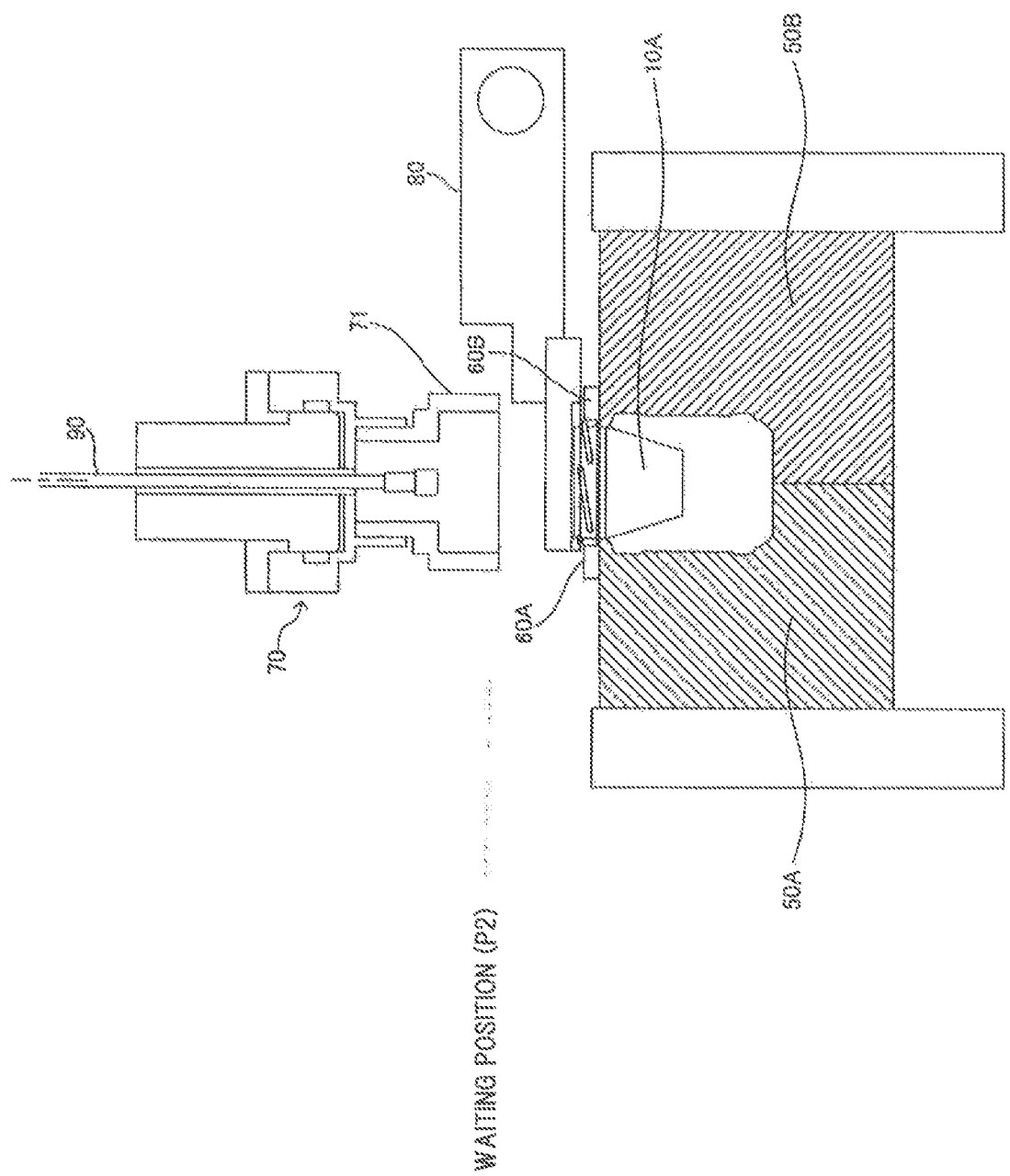
FIG. 6 is an operation explaining drawing which illustrates a state in which the blow cavity split molds are clamped together with the blow core set in a waiting position.
Figure 7:
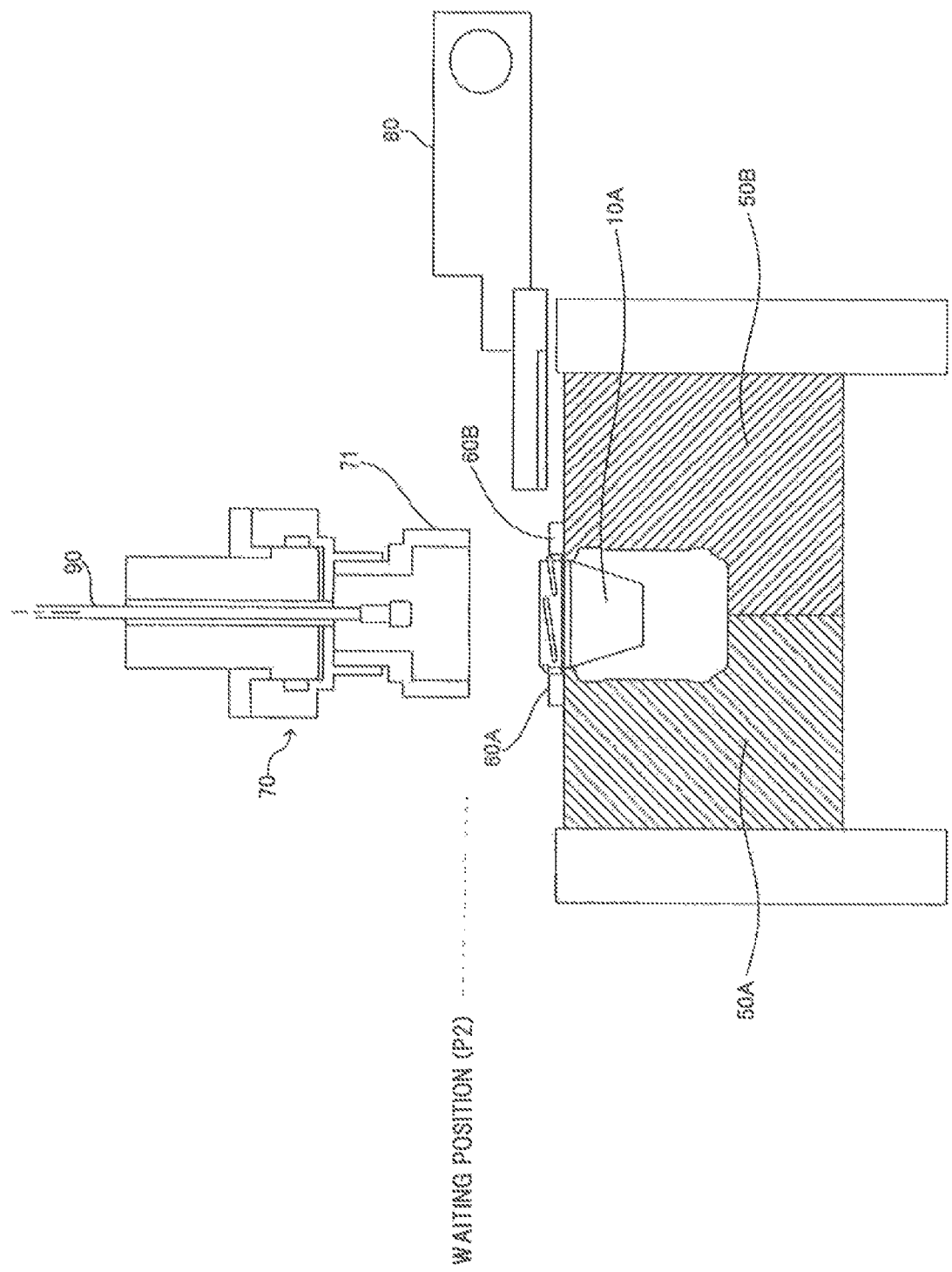
FIG. 7 is an operation explaining drawing which illustrates a conveying out of a transfer member after the clamping of the blow cavity split molds with the blow core held in the retreating position.

A blow molding cycle completes one cycle after each of the following steps are performed: 1) the preform 10A is conveyed to a blow molding position by the chuck member 80; 2) the pair of blow cavity split molds 50A, 50B are closed and clamped together; 3) the chuck member 80 is detached from the mouth portion 20 of the preform 10A which is supported in the pair of blow cavity split molds 50A, 50B which are clamped together; 4) the mouth portion 20 and the flange 25 are sealed up by the blow core mold 70 around the circumference thereof; 5) a wide-mouthed container 10 is blow-molded from the preform 10A by introducing blow air from the blow core mold 70 and liner driving a stretching rod 90 (refer to FIGS. 5 to 9) (refer to FIG. 7); 6) the blow core mold 70 is detached and retreated from the mouth portion 20; 8) the mouth portion 20 is chucked (grabbed) by the chuck member 80 so as to support the wide-mouthed container 10, 9) the pair of blow cavity split molds 50A, 50B are opened; and 10) the wide-mouthed container 10 is conveyed out the opened blow cavity split molds 50A, 50B by the chuck member 80 (refer to FIG. 7). Then, the blowing cycle proceeds to the next cycle. Here, in FIG. 8, reference numeral 200 denotes inner wall surfaces of the pair of blow cavity split molds 50A, 50B for forming the wide-mouthed container 10.

Figure 5:
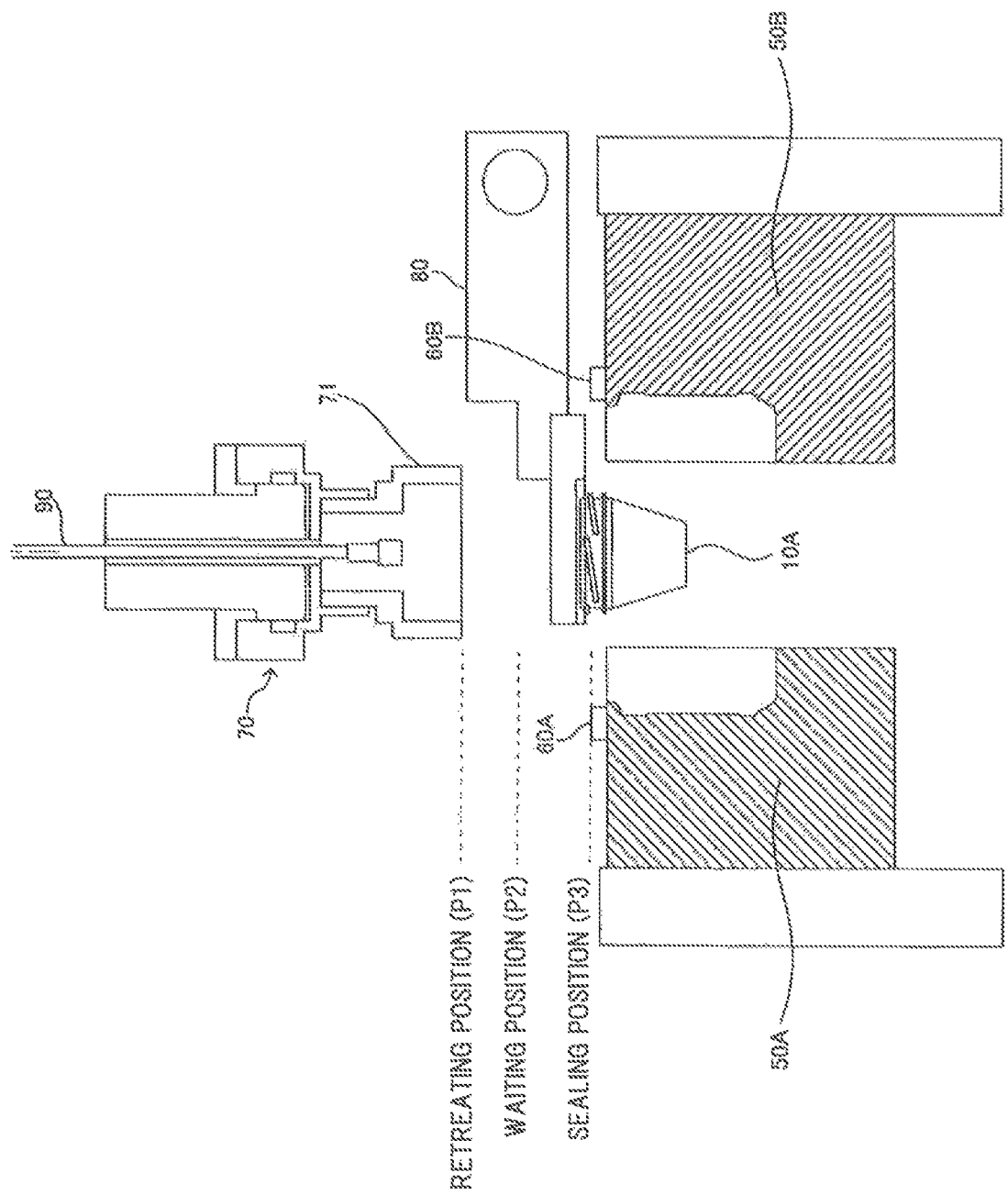
FIG. 5 is an operation explaining drawing which illustrates an operation of conveying a preform into the opened blow cavity split molds with a blow core set in a retreating position.

Here, FIG. 5 shows a state where the step 1) described above is carried out. In FIG. 5, an example of a retreating position (P1), a waiting position (P2) and a sealing position (P3), which will be described later, are illustrated. In this state, the blow core mold 70 is set in the retreating position (P1) where the blow core mold 70 is retreated to a highest position. As shown in FIG. 5, in the step 1), a direction in which the preform 10A is conveyed to the blow molding position by the chuck member 80 with the mouth portion 20 of the preform 10A chucked by the chuck member 80 is a direction is a direction from a back surface toward a front surface of FIG. 5. This chuck member 80 chucks preforms 10A by a number which are blow-molded simultaneously.

FIG. 6 shows the step 2) described above. Namely, after the preform 10A is conveyed to the blow molding position by the chuck member 80 as a result of carrying out the step 1), the pair of blow cavity split molds 50A, 50B are closed and clamped together. As this occurs, the pair of projecting members 60A, 60B move together with the pair of blow cavity split molds 50A, 50B in a mold closing direction, and the flange 25 of the preform 10A can be positioned to be centered by the positioning portions 62. Even if the flange 25 of the preform 10A which is chucked by the chuck member 80 is not in contact with the upper surfaces 50a, 50b of the pair of blow cavity split molds 50A, 50B, since the flange 25 has a certain thickness, the flange 25 is positioned by the positioning portions 62. In addition, in this step, the blow core mold 70 can be set in the waiting position (P2) shown in FIG. 6 which is lower than the retreating position (P1) shown in FIG. 5. Even though the blow core mold 70 is set in the waiting position (P2), the blow core mold 70 is not interfering with the chuck member 80. By making use of the time spent carrying out the step 2), the blow core mold 70 is lowered from the retreating position (P1) shown in FIG. 5 to the waiting position (P2).

FIG. 7 shows the step 3) described above. Namely, the chuck member 80 is detached from the mouth portion 20 of the preform 10A which is supported in the pair of blow cavity split molds 50A, 50B as a result of the pair of blow cavity split molds 50A, 50B being clamped together. As a result of the chuck member 80 being detached as described above, the flange 25 of the preform 10A is provided on the upper surfaces 50a, 50b of the pair of blow cavity split molds 50A, 50B. In the event that the chuck member 80 adopts a type in which two chucking pieces are normally biased in a closing direction by a spring, when the chuck member 80 is detached from the mouth portion 20, the spring is elastically deformed as the chuck member 80 is retracted, whereby the chuck member 80 is drawn from the mouth portion 20. As this occurs, although external force is applied to the preform 10A, in this embodiment, since the flange 25 is positioned by the positioning portions 62, the preform 10A is not moved to be decentered. In the detaching step of the chuck member 80, the blow core mold 70 stays in the waiting position (P2) same as the position in FIG. 6. Here, the direction in which the chuck member 80 is detached from the mouth portion 20 when the pair of blow cavity split molds 50A, 50B are clamped together is a direction (the opening and closing direction of the blow cavity split molds 50A, 50B) which is perpendicular to the conveying direction of the preform 10A shown in FIG. 5 (the direction from the back surface toward the front surface of FIG. 5). A detaching stroke of the chuck member 80 when the chuck member 80 is detached from the mouth portion 20 is relatively short, and therefore, since little vibration is produced in the chuck member 80, there are no fears that the blow core mold 70 staying in the waiting position (P2) interferes with the chuck member 80.

Figure 8:
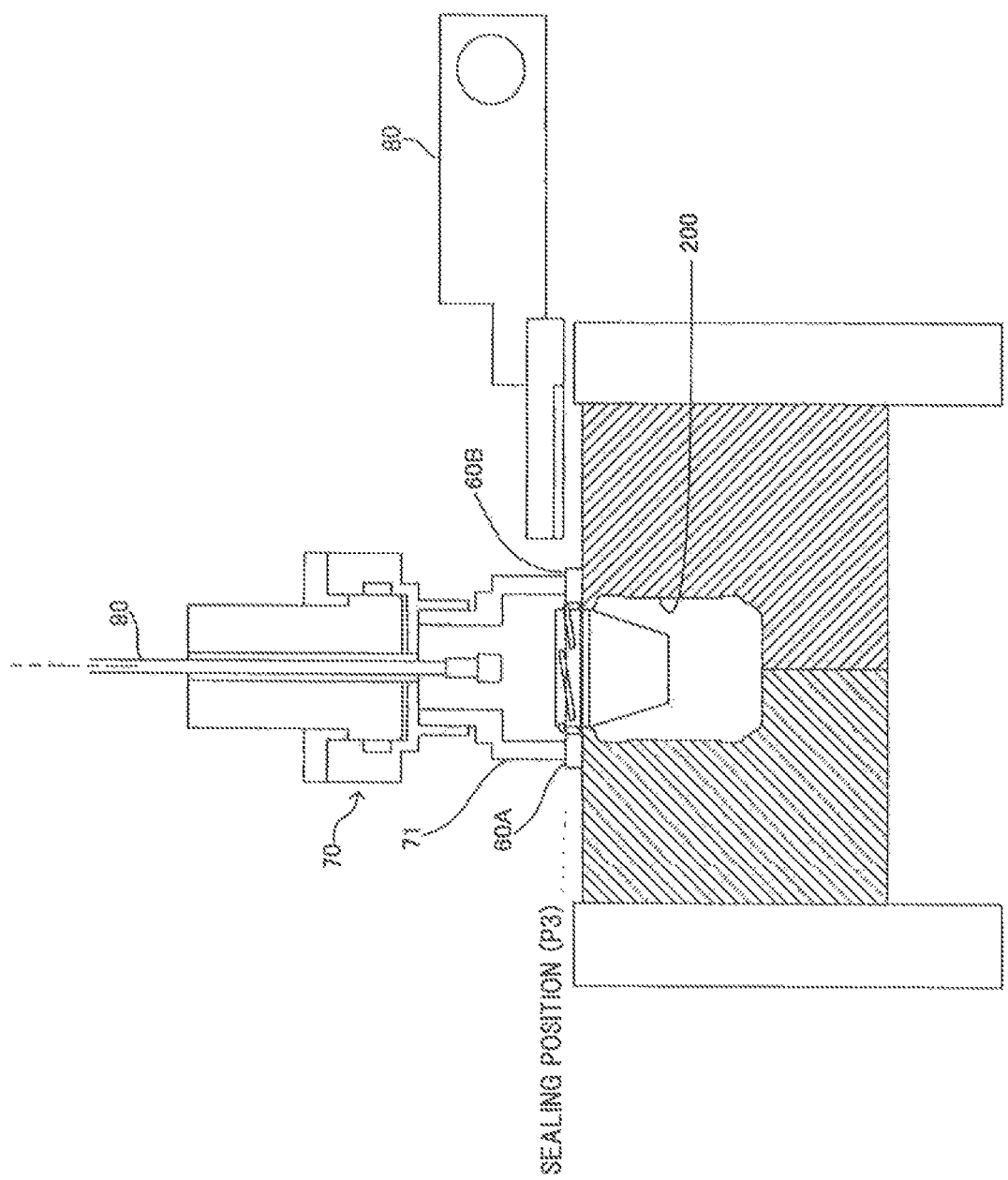
FIG. 8 is an operation explaining drawing which illustrates a sealing state with the blow core set in a sealing position.

FIG. 8 shows the step 4) described above. Namely, the state shown in FIG. 3 where the mouth portion 20 and the flange 25 are sealed up by the blow core mold 70 around the circumference thereof is realized, and the blow core mold 70 is set in the lowest sealing position (P3).

In this way, the blow core mold 70 only has to be lowered from the waiting position (P2) to be set in the sealing position (P3), and this shortens a moving stroke of the blow core mold 70, thereby making it possible to quicken the sealing action of sealing up the mouth portion 20 and the flange 25 around the circumference thereof by the blow core mold 70.

The blow molding step which is the step 5) described above is also carried out with the blow core mold 70 held in the sealing position (P3). In addition, since the preform 10A is centered during the blowing step, a molding failure due to the preform 10A being disposed eccentrically is suppressed. In the steps 6) to 10) described above, the blow core mold 70 may be lifted up directly from the sealing position (P3) shown in FIG. 8 to the retreating position (P1) shown in FIG. 5. Alternatively, the blow core mold 70 may be lifted up from the sealing position (P3) to the retreating position (P1) shown in FIG. 5 by way of the waiting position (P2) shown in FIG. 6, that is, by firstly lifting up the blow core mold 70 to the waiting position (P2) and then lifting it up to the retreating position (P1).

4. Preform Sealing/Positioning Part

The preform sealing/positioning part 60 can be used as consumables to thereby make it possible to reduce the wear of the pair of blow cavity split molds 50A, 50B and the blow core mold 70 when the sealing operation is performed therebetween. In addition, the preform sealing/positioning part 60 can also be used as an adjustment part for ensuring the sealing property corresponding to the outside diameter of the flange 25 of the preform 10A.

Two sealing/positioning parts 64, 65 shown in FIGS. 9(A), 9(B) differ from each other only in that the sealing/positioning parts 64, 65 have a positioning portion 62A of a inner diameter R1 and a positioning portion 62B of a inner diameter R2, respectively, and the airtight sealing portions 61 and the attaching portions 63 are common for both the sealing/positioning parts 64, 65. There may be a case where the flanges 25 of the preforms 10A slightly differ in size from one another lot by lot. This is because the whitening and crystallizing conditions of the mouth portions 20 and the flanges 25 vary or the mouth portions 20 and the flanges 25 are affected by environmental conditions. In the event that a plurality of sealing/positioning parts 64, 65, . . . having positioning portions 62A, 62B, . . . of inner diameters R1, R2, . . . are prepared, the positioning accuracy of the preforms can be maintained while the pair of blow cavity split molds 50A, 50B are used commonly.

Here, while the embodiment has been described in detail heretofore, it will easily be understood by those skilled in the art that many modifications can be made without departing substantially from the novel matters and advantages of the invention. Consequently, such modified examples resulting from the modifications are to be included in the scope of the invention.

For example, the tubular portion 71 of the blow core mold 70 may have a double-sealing configuration in which the tubular portion 71 is brought into contact not only with the pair of projecting portions 60A, 60B but also with the top flange 24 of the mouth portion 20 at a step portion formed on an inner surface of the tubular portion 71. In addition, the application of the invention is not necessarily limited to the device and method of blow-molding the wide-mouthed container 10, and hence, the invention can be applied to the blow molding of a wide range of hollow containers irrespective of inner diameters of mouth portions and shapes of flanges.

While the invention has been described in detail and by reference to the specific embodiment, it is obvious to those skilled in the art that various alterations or modifications can be made thereto without departing from the spirit and scope of the invention.

This patent application is based on Japanese Patent Application No. 2014-195700 filed on Sep. 25, 2014, the contents of which are incorporated herein by reference.

REFERENCE SIGNS LIST 10 wide-mouthed container
10A preform
20 mouth portion
22, 23 cap attaching portion (thread)
25 flange
30, 30A body portion
40, 40A bottom portion
50A, 50B a pair of blow cavity split molds
50a, 50b upper surface
60, 64, 65 preform sealing/positioning part
60A, 60B a pair of projecting members
61 airtight sealing portion
62, 62A, 62B positioning portion
63 attaching portion
70 blow core mold
71 tubular portion
71a lower end face
80 chuck member
90 stretching rod

The invention claimed is:

1. A blow molding device for blow-molding a preform which includes a mouth portion, a body portion, and a flange provided between the mouth portion and the body portion into a container, the blow molding device comprising:
    a pair of blow cavity split molds;
    a chuck member that chucks the mouth portion and conveys the preform to the pair of blow cavity split molds which are opened;
    a blow core mold that includes a tubular portion which surrounds circumferences of the mouth portion and the flange of the preform and introduces blow air into the preform, after the chuck member is retracted from the preform which is disposed in the pair of blow cavity split molds which are closed; and
    a pair of projecting members which have a halved ring shape and are provided detachably on each upper surface of the pair of blow cavity split molds,
    wherein each of the pair of projecting members includes:
        an airtight sealing portion which is in contact with a lower end face of the tubular portion of the blow core mold,
        a positioning portion which positions the flange of the preform when the pair of blow cavity split molds are closed,
    wherein the lower end face of the tubular portion of the blow core mold which is in contact with the airtight sealing portion is a bottom surface which is the lowest part of the blow core mold,
    wherein an outer circumferential surface of each of the pair of projecting members is not in contact with the blow core mold,
    wherein each of the pair of projecting members have an attaching portion which is provided further radially outwards than the airtight sealing portion and which is fastened to each upper surface of the pair of blow cavity split molds, and
    wherein the airtight sealing portion is formed on an upper surface of the projecting member, and the positioning portion for positioning the flange is formed on an inner circumferential surface of the projecting member.

2. The blow molding device according to claim 1, wherein the airtight sealing portion has a lower wear resistance than that of the lower end face of the tubular portion.

* * * * *